United States Patent
George et al.

(10) Patent No.: US 11,814,182 B2
(45) Date of Patent: Nov. 14, 2023

(54) CONTROL SCHEME FOR NEGATIVE TEMPERATURE COEFFICIENT OF RESISTIVITY HEATERS

(71) Applicant: GOODRICH CORPORATION, Charlotte, NC (US)

(72) Inventors: Adam George, Alliance, OH (US); Mark James Didyk, Mogadore, OH (US); Reid Philip Beery, Rittman, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 383 days.

(21) Appl. No.: 16/932,357

(22) Filed: Jul. 17, 2020

(65) Prior Publication Data
US 2022/0017227 A1    Jan. 20, 2022

(51) Int. Cl.
- *B64D 15/22* (2006.01)
- *B64D 15/12* (2006.01)
- *G05D 23/19* (2006.01)
- *G05D 23/24* (2006.01)
- *H05B 1/02* (2006.01)

(52) U.S. Cl.
CPC ............ *B64D 15/22* (2013.01); *B64D 15/12* (2013.01); *G05D 23/1902* (2013.01); *G05D 23/24* (2013.01); *H05B 1/0236* (2013.01)

(58) Field of Classification Search
CPC ........ B64D 15/12; B64D 15/20; B64D 15/22; G05D 23/19; G05D 23/1902; G05D 23/24; G05D 23/2401
See application file for complete search history.

(56) References Cited

U.S. PATENT DOCUMENTS

| | | | | |
|---|---|---|---|---|
| 6,145,787 A * | 11/2000 | Rolls | ...... | F03D 1/065 416/223 R |
| 6,227,492 B1 * | 5/2001 | Schellhase | ...... | B64D 15/14 244/134 D |
| 6,283,411 B1 * | 9/2001 | Giamati | ...... | B64D 15/12 244/134 A |
| 7,546,980 B2 * | 6/2009 | Giamati | ...... | B64D 15/14 244/134 D |
| 9,346,550 B2 | 5/2016 | Gambino et al. | | |
| 9,849,991 B2 | 12/2017 | Botura et al. | | |

(Continued)

FOREIGN PATENT DOCUMENTS

EP    3668270    6/2020

OTHER PUBLICATIONS

European Patent Office, European Search Report dated Dec. 1, 2022 in Application No. 21182904.9.

*Primary Examiner* — Michael H Wang
(74) *Attorney, Agent, or Firm* — SNELL & WILMER L.L.P.

(57) ABSTRACT

A system for controlling a multi-zone resistive heater. The system includes a first zone of the multi-zone resistive heater formed from a material having a negative temperature coefficient of resistivity (TCR) and configured to receive a first power to generate thermal energy. The system further includes a second zone of the multi-zone resistive heater formed from the material having the negative TCR, separated from the first zone by a gap, and configured to receive a second power to generate the thermal energy.

10 Claims, 6 Drawing Sheets

(56) References Cited

U.S. PATENT DOCUMENTS

| | | | | |
|---|---|---|---|---|
| 2007/0112480 A1* | 5/2007 | Smith | ............... | H04B 3/548 |
| | | | | 701/3 |
| 2008/0156937 A1* | 7/2008 | Hindel | ............... | B64D 15/12 |
| | | | | 244/134 D |
| 2010/0096507 A1 | 4/2010 | Villinger | | |
| 2014/0138490 A1* | 5/2014 | Botura | ............... | H05B 1/0236 |
| | | | | 244/134 R |
| 2014/0191084 A1* | 7/2014 | Gambino | ............... | B64D 15/12 |
| | | | | 244/134 D |
| 2014/0367522 A1* | 12/2014 | Stonestreet, II | ....... | B64D 15/14 |
| | | | | 244/134 D |
| 2016/0009400 A1* | 1/2016 | English | ............... | B64D 15/22 |
| | | | | 62/139 |
| 2016/0221680 A1* | 8/2016 | Burton | ............... | H05B 3/146 |
| 2020/0086999 A1 | 3/2020 | Jacob et al. | | |

\* cited by examiner

CONTROL SCHEME FOR NEGATIVE TEMPERATURE COEFFICIENT OF RESISTIVITY HEATERS

FIELD

The present disclosure relates to systems and methods for heating aircraft components using multi-zone resistive heating elements.

BACKGROUND

Various aircraft components (such as a nacelle, a wing, or the like) may be subjected to relatively cold temperatures (e.g., below freezing) as well as moisture. This combination may result in ice formation on the components. In that regard, heating mats may be integrated into these aircraft components at locations that are susceptible to ice formation (such as leading edges of the components). The heating mats may be multi-zone resistive heaters. Each zone of the heating mat may be separated from adjacent zones by a gap. It is desirable to maximize heating of the gap to reduce ice formation at the gap due to the lack of heating elements at this location.

SUMMARY

Disclosed herein is a system for controlling a multi-zone resistive heater. The system includes a first zone of the multi-zone resistive heater formed from a material having a negative temperature coefficient of resistivity (TCR) and configured to receive a first power to generate thermal energy. The system further includes a second zone of the multi-zone resistive heater formed from the material having the negative TCR, separated from the first zone by a gap, and configured to receive a second power to generate the thermal energy.

Any of the foregoing embodiments may further include a controller configured to transmit the first power to the first zone and to transmit the second power to the second zone.

In any of the foregoing embodiments, the controller is further configured to transmit the first power to the first zone during a first time period and to start transmitting the second power to the second zone during the first time period.

In any of the foregoing embodiments, a total power equal to a sum of the first power at an end of the first time period and the second power at the end of the first time period is equal to or less than a total allowable system power.

In any of the foregoing embodiments, the controller is further configured to start transmitting the second power to the second zone before the end of the first time period.

In any of the foregoing embodiments, the first power increases at a beginning of the first time period.

In any of the foregoing embodiments, the material having the negative TCR may include a carbon, a graphite, a carbon nanotube, a printed element having a conductive carbon loaded ink, or another allotrope.

In any of the foregoing embodiments, the multi-zone resistive heater is configured for use with an aircraft.

In any of the foregoing embodiments, the multi-zone resistive heater is configured for use with an airfoil of the aircraft.

In any of the foregoing embodiments, the gap operates as a dielectric boundary between the first zone and the second zone.

Also disclosed is a system for controlling a multi-zone resistive heater. The system includes a first zone of the multi-zone resistive heater formed from a material having a negative temperature coefficient of resistivity (TCR) and configured to receive a first power to generate thermal energy. The system further includes a second zone of the multi-zone resistive heater formed from the material having the negative TCR, separated from the first zone by a gap, and configured to receive a second power to generate the thermal energy. The system further includes a controller configured to control power distribution to the first zone and to the second zone separately.

In any of the foregoing embodiments, the controller is further configured to: transmit the first power to the first zone during a first time period; and begin transmitting the second power to the second zone before an end of the first time period.

In any of the foregoing embodiments, a total power equal to a sum of the first power at the end of the first time period and the second power at the end of the first time period is equal to or less than a total allowable system power.

In any of the foregoing embodiments, the first power increases at a beginning of the first time period.

In any of the foregoing embodiments, the material having the negative TCR includes at least one of a carbon, a graphite, a carbon nanotube, a printed element having a conductive carbon loaded ink, or another allotrope.

In any of the foregoing embodiments, the multi-zone resistive heater is configured for use with an aircraft.

Also disclosed is a method for controlling a multi-zone resistive heater. The method includes transmitting, at a start of a first time period and until an end of the first time period, first power to a first zone of the multi-zone resistive heater, the first zone being formed from a material having a negative temperature coefficient of resistivity (TCR). The method further includes transmitting, at the start of a second time period and until an end of the second time period, second power to a second zone of the multi-zone resistive heater, the second zone being formed from the material having the negative TCR.

In any of the foregoing embodiments, the start of the second time period is before the end of the first time period.

In any of the foregoing embodiments, a total power equal to a sum of the first power at the end of the first time period and the second power at the end of the first time period is equal to or less than a total allowable system power.

In any of the foregoing embodiments, the material having the negative TCR includes at least one of a carbon, a graphite, a carbon nanotube, a printed element having a conductive carbon loaded ink, or another allotrope.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
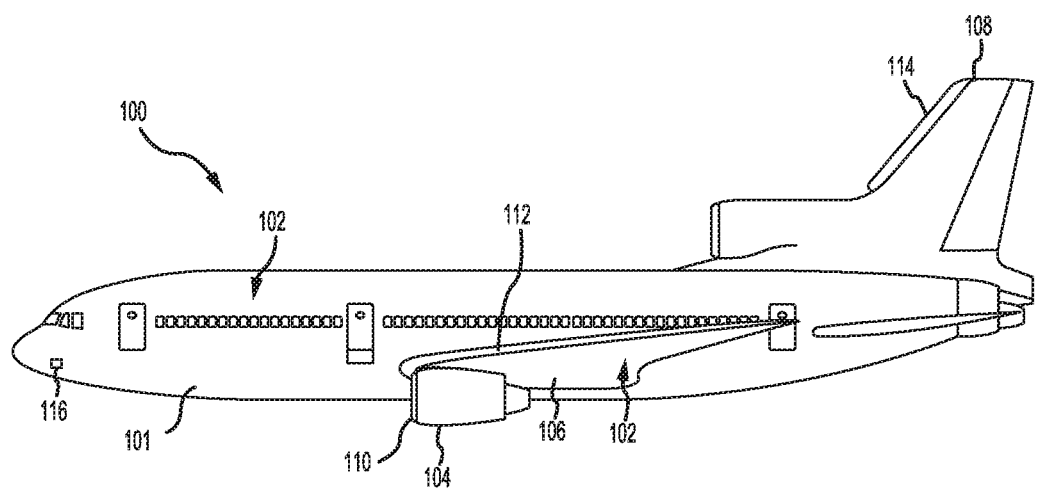
FIG. 1 illustrates an aircraft including various components, in accordance with various embodiments.

Referring now to FIG. 1, an aircraft 100 is shown. The aircraft 100 may include multiple aircraft components 102 which may be susceptible to ice formation thereon. For example, these aircraft components 102 may include a nacelle 104, a wing 106, a tail wing 108, or the like. Heater mats may be incorporated into the aircraft components 102 that are most susceptible to ice formation (e.g., leading edges of the components 102). For example, a heater mat 110 may be integrated into the leading edge of the nacelle 104, a heater mat 112 may be integrated into the leading edge of the wing 106, and a heater mat 114 may be integrated into the leading edge of the tail wing 108.

The aircraft 100 may further include one or more controller 116. The controller 116 may include a logic device such as one or more of a central processing unit (CPU), an accelerated processing unit (APU), a digital signal processor (DSP), a field programmable gate array (FPGA), an application specific integrated circuit (ASIC), or any other device capable of implementing logic. In various embodiments, the controller 116 may further include any non-transitory memory known in the art. The memory may store instructions usable by the logic device to perform operations as described herein. The controller 116 may be coupled to various components of the aircraft 100 and may control power distribution to the corresponding heater mat 110, 112, 114. In various embodiments, one controller may be used for multiple heater mats and, in various embodiments, a separate controller may be used for each heater mat.

The heater mats may be multi-zone resistive heaters. That is, each zone may receive electrical power and may have a resistance. The resistance of each zone may convert the electrical power into thermal energy (heat). This thermal energy may resist ice formation on the component onto which the heater mat is located, and may melt any already-formed ice. The controller 116 may control power distribution to each zone of a heater mat independently.

Figure 2:
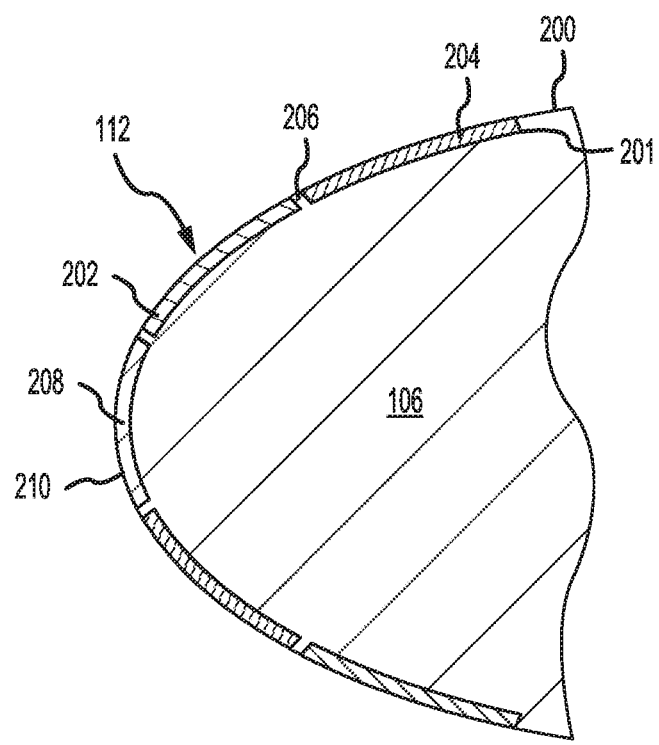
FIG. 2 is a illustrates a multi-zone resistive heater for use with a wing of the aircraft of FIG. 1, in accordance with various embodiments.

Referring now to FIG. 2, additional details of the heater mat 112 are shown. As mentioned above, the heater mat 112 is installed on the wing 106, which is an airfoil, in order to generate thermal energy for deicing the wing 106. The heater mat 112 may be a multi-zone resistive heater. In that regard, the heater mat 112 may include multiple zones which are powered separately, and each draw electrical power (via a voltage or current signal) and convert electrical power into thermal energy. Although two zones are discussed herein, the contents of the present disclosure may be applied to a multi-zone resistive heater having any quantity of zones.

In particular, the heater mat 112 includes a first zone 202 and a second zone 204 separated by a gap 206. The heater mat 112 may include a metallic skin 200. An adhesive 201, such as a film adhesive, may couple the metallic skin 200 to the first zone 202 and the second zone 204. In various embodiments, the heater mat 112 may be formed by applying the adhesive to the metallic skin 200, coupling a material from which the zones 202, 204 are formed to the metal skin 200 via the adhesive 201 and separated by a predetermined dielectric gap.

The first zone 202 and the second zone 204 may be formed from a material having a negative temperature coefficient of resistivity (TCR). A negative TCR means that electrical resistance of the material increases as a temperature of the material decreases, and that the electrical resistance decreases as the temperature of the material increases. As discussed below, using materials having a negative TCR provide advantages over a conventional material which has a positive temperature coefficient of resistivity. The material of the first zone 202 and the second zone 204 may include any material having a negative TCR. For example, the material may include at least one of a carbon, a graphite, a carbon nanotube, a printed element having a conductive carbon loaded ink, or any other allotrope.

The gap 206 may operate as a dielectric boundary between the first zone 202 and the second zone 204, electrically isolating the first zone 202 from a second zone 204. In various embodiments, an insulating or dielectric material may be positioned within the gap 206.

In various embodiments, the heater mat 112 may include an anti-ice parting strip 208 located at a leading edge 210 of the wing 106. The anti-ice parting strip 208 may be formed from the same material as the zones 202, 204 or a different material. The anti-ice parting strip 208 may be designed to always receive power and always convert the electrical power into thermal energy.

Figure 3A:
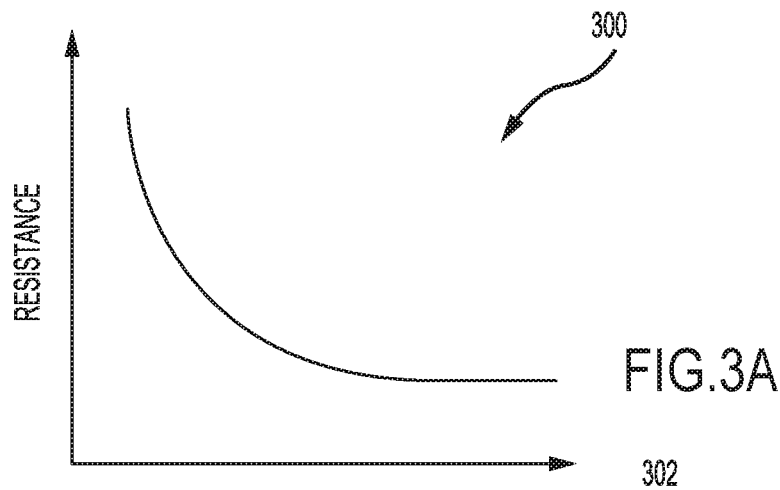
FIGS. 3A, 3B, and 3C illustrate various properties of a material having a negative temperature coefficient of resistivity (TCR), in accordance with various embodiments.
Figure 3B:
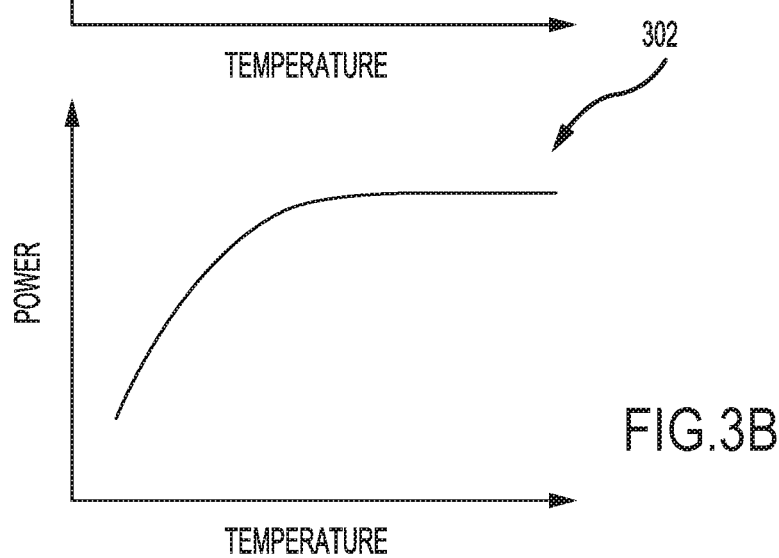
Figure 3C:
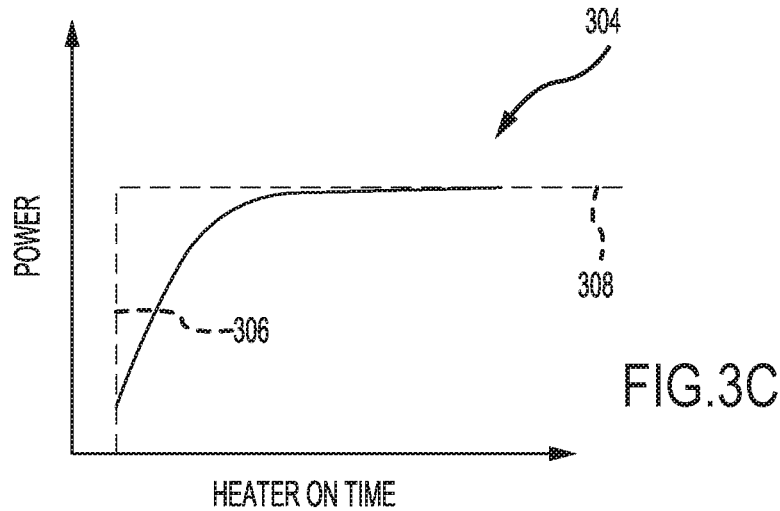

Referring now to FIGS. 3A, 3B, and 3C, features of a material having a negative TCR are discussed. FIG. 3A illustrates a graph 300 that plots resistance (y-axis) and temperature (x-axis). As shown, the resistance of the material having a negative TCR decreases as the temperature increases, and the resistance increases as the temperature decreases. FIG. 3B illustrates a graph 302 that plots power (y-axis) drawn by the material (as a function of resistivity) and temperature (x-axis), assuming a constant voltage or current is applied to the material. As shown, the temperature of the material increases as the power increases, and the temperature of the material decreases as the power decreases. FIG. 3C illustrates a graph 304 that plots power (y-axis) drawn by the material (as a function of resistivity) as a function of time (x-axis) after a voltage or current is applied to the material. As shown, the power drawn by the material increases from a power on time 306 until the power reaches a steady state value 308. This increase in power is a result of the negative TCR. As voltage is provided to the material, the material increases in temperature which results in a decrease in resistance. The decrease in resistance results in an increase in power drawn by the material until the resistance and power reach a steady state.

Figure 4:
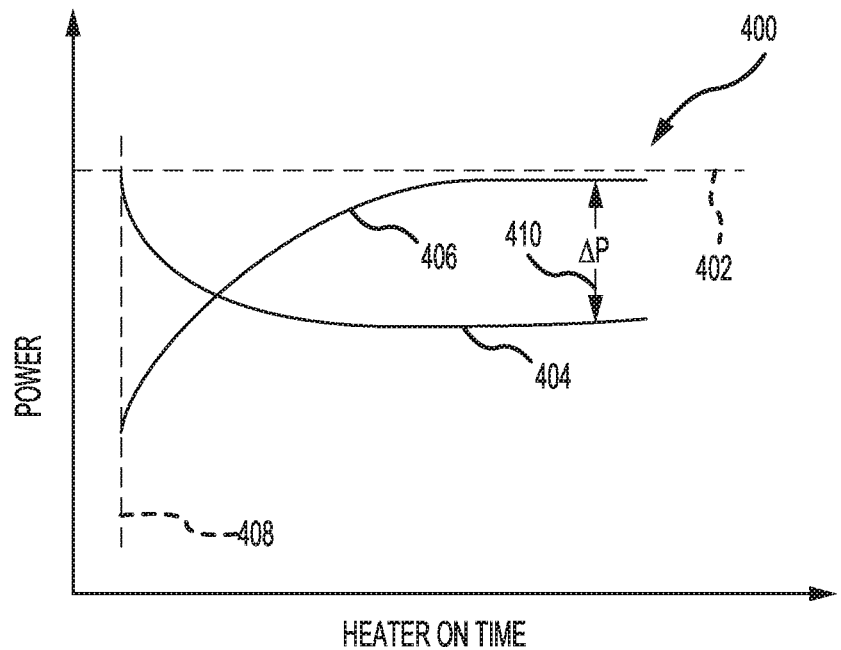
FIG. 4 illustrates characteristics of a heater element having a positive TCR and a heater element having a negative TCR, in accordance with various embodiments.

Referring now to FIG. 4, a graph 400 illustrates a difference in operation between a negative TCR material (illustrated by a line 406) and a positive TCR material (illustrated by a line 404). The graph 400 plots power drawn by the respective material (y-axis) as a function of time from a power on time 408. The graph 400 further illustrates a power value 402 which represents a total allowable system power which can be drawn from a corresponding controller. It is desirable to cause any power drawn from the controller to be equal to or less than the power value 402 (total allowable system power).

At the power on time 408, the positive TCR material is at a maximum power value due to the properties of the positive TCR material. Following the power on time 408, the positive TCR material begins to draw less power until it reaches a steady state value. On the other hand, the negative TCR material begins to draw additional power immediately following the power on time until it reaches a steady state value. As shown, the negative TCR material can operate at or relatively close to the power value 402 for a longer period of time than the positive TCR material. In that regard and staying within the confines of the total allowable system power value 402, the negative TCR material draws a greater amount of power at steady state than the positive TCR material at steady state. This difference in steady state power draw is illustrated by ΔP 410.

Figure 5:
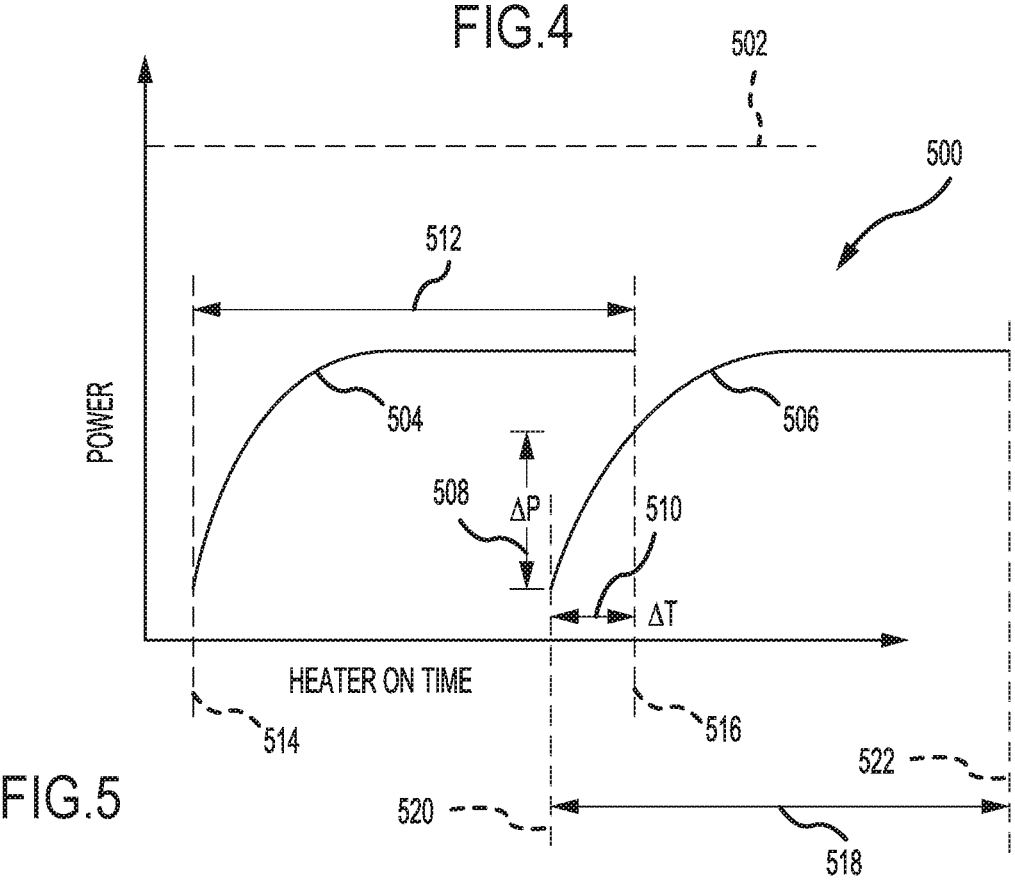
FIG. 5 illustrates characteristics of two zones of a multi-zone resistive heater using a material having a negative TCR, in accordance with various embodiments.

Turning now to FIGS. 2 and 5, a graph 500 illustrates exemplary power drawn by the first zone 202 and the second zone 204 using the controller 116 of FIG. 1 as a function of time. A first line 504 illustrates power drawn by the first zone 202, and a second line 506 illustrates power drawn by the second zone 204. As shown, power is drawn by the first zone 202 during a first time period 512 and power is drawn by the second zone 204 during a second time period 518. The first time period 512 has a beginning 514 and an end 516, and the second time period 518 has a beginning 520 and an end 522. As shown, the beginning 520 of the second time period 518 is before the end 516 of the first time period 512. This allows heat to be provided to the gap 206 at all times, reducing the likelihood of ice buildup at the gap 206. This is made possible by the negative TCR material increasing in power draw over time.

Because of the relatively great power draw of positive TCR materials at the first application of voltage, it is difficult to control a heater mat using positive TCR to provide power to multiple zones at any given time because the steady state power draw would be relatively low, thus reducing total heating of the heater mat. However, using the negative TCR materials, power can be provided to the first zone 202 and the second zone 204 simultaneously. In that regard, a sum of the power provided to the first zone 202 and the power provided to the second zone 204 at the end 516 of the first time period 512 remains less than or equal to the total allowable system power 502 due to the low initial power drawn by the second zone 204 at the beginning 520 of the second time period 518. In that regard, power may be drawn by the first zone 202 and the second zone 204 simultaneously for a predetermined amount of time 510 that is based on the properties of the material of the first zone 202 and the second zone 204 and based on the total allowable system power 502.

Figure 6A:
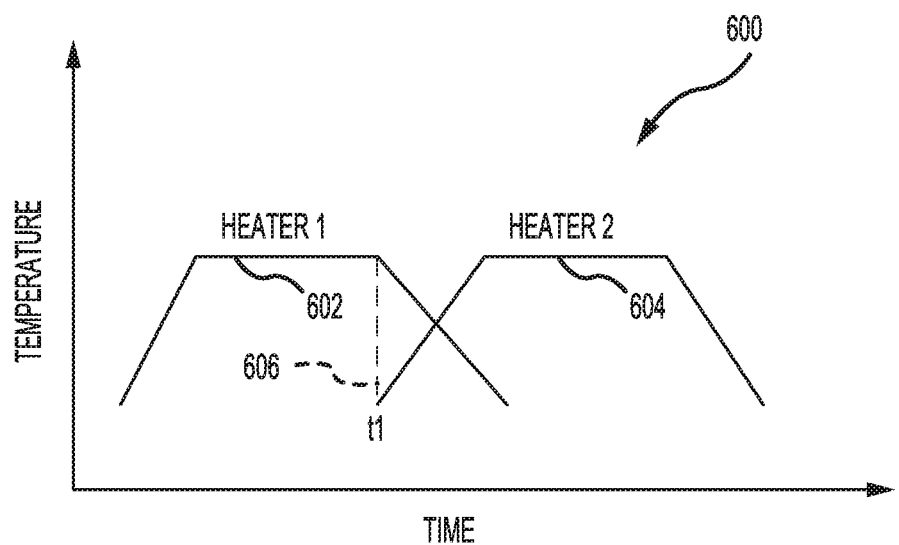
FIGS. 6A and 6B illustrate characteristics of two zones of a multi-zone resistive heater using a positive TCR material and a negative TCR material, respectively, in accordance with various embodiments.
Figure 6B:
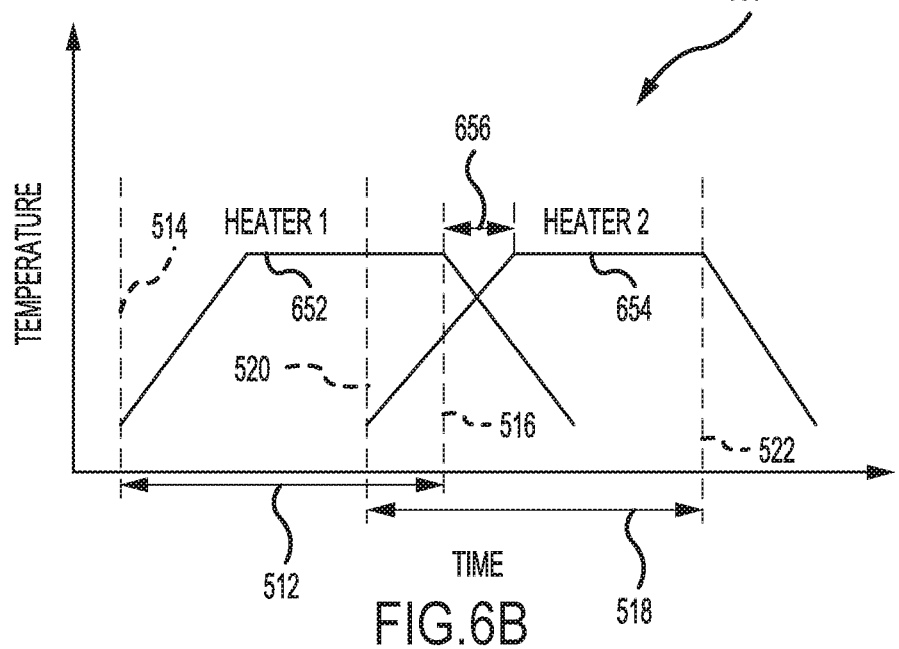

Referring now to FIGS. 6A and 6B, another difference between a conventional heater mat (represented by FIG. 6A) and a heater mat utilizing a negative TCR material (represented by FIG. 6B) is shown. A plot 600 illustrates temperature of the conventional heater mat as a function of time, and a plot 650 illustrates temperature of the heater mat 112 of FIG. 2 as a function of time. A first line 602 represents a first zone of the conventional heater mat and a second line 604 represents a second zone of the conventional heater mat. As shown at a time t1, power is removed from the first heater mat and applied to the second heater mat. This results in a relatively long period of time in which a temperature applied to a gap between the zones is significantly reduced.

A plot 650 illustrates a temperature of the heater mat 112 of FIG. 2 that utilizes the negative TCR material. As shown, the temperature of the first zone (represented by a line 652) begins increasing at the beginning 514 of the first time period 512 and begins decreasing at the end 516 of the first time period 512 (residual heat is dissipated after the end 516 of the first time period 512). Also, the temperature of the second zone (represented by a line 654) begins increasing at the beginning 520 of the second time period 518 and begins decreasing at the end 522 of the second time period 518.

As can be seen by looking at the plots 600 and plot 650, there is a shorter amount of time 656 in which both of the first zone and the second zone are below a maximum temperature when using the negative TCR material as compared to the positive TCR material.

Figure 7:
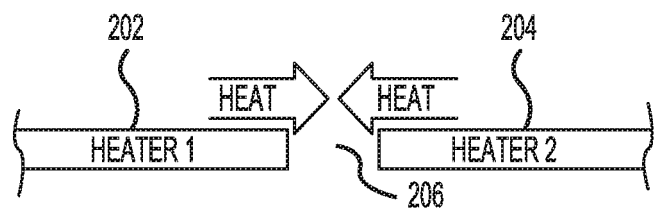
FIG. 7 illustrates heat generated by a first zone and a second zone of the multi-zone resistive heater of FIG. 2, in accordance with various embodiments.

FIG. 7 illustrates heat generated by the first zone 202 and the second zone 204 at a time between the beginning 520 of the second time period 518 and the end 516 of the first time period 512. As shown, both the first zone 202 and the second zone 204 generate thermal energy during this time, thus heating the gap 206 and reducing the likelihood of ice buildup in the gap 206.

Figure 8:
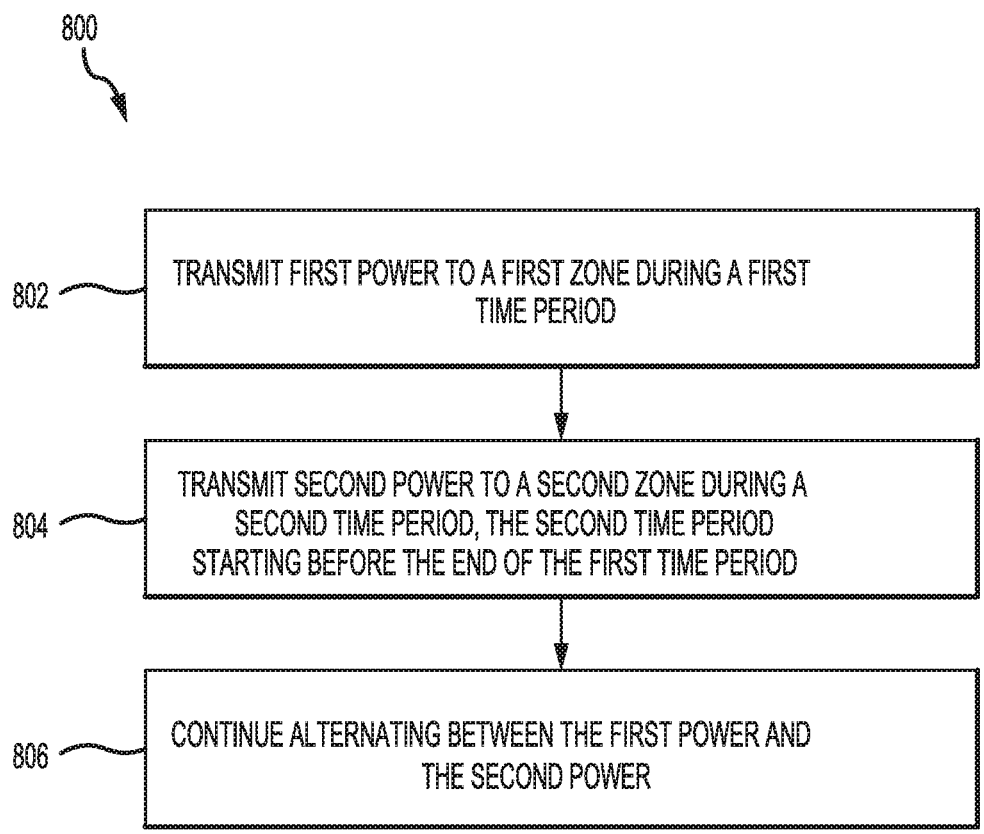
FIG. 8 illustrates a method for controlling a multi-zone resistive heat, in accordance with various embodiments.

Referring now to FIG. 8, a flowchart illustrates a method 800 for controlling a multi-zone resistive heater, such as the heater mat 112 of FIG. 2. The method 800 begins in block 802 in which a controller, such as the controller 116 of FIG. 1, transmits first power to a first zone (e.g., the zone 202 of FIG. 2) during a first time period. In block 804, the controller transmits second power to a second zone during a second time period. In various embodiments, the second time period may begin before the end of the first time period. In block 806, the controller may continue alternating between the first power and the second power. For example, the controller may begin providing the first power again before the end of the second time period, and so forth, until heating is no longer desired. If more than two zones are present, the controller may transmit power to a third zone before the end of the second time period, transmit power to a fourth zone before the end of a third time period, and so forth. In various embodiments, the controller may transmit power to one, two, or more zones simultaneously (e.g., may transmit power to a first and third zone during a first time period and to a second and fourth zone during a second time period).

Where used in the context above, a controller may transmit power to a zone of a heating element in any of a number of manners. For example, the controller may directly output a current or voltage signal to the zone. As another example, the controller may control a switch to open or close to cease or begin, respectively, application of a current or voltage signal to the zone. As yet another example, the controller may control a voltage or current source to output or cease outputting the current or voltage signal to the zone. Any other method of direct or indirect application or control of application of a power signal (e.g., voltage or current signal) to the zone is contemplated by the present disclosure.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for controlling a multi-zone resistive heater, the system comprising:
   a controller configured to transmit a total power;
   a first zone of the multi-zone resistive heater formed from a material having a negative temperature coefficient of resistivity (TCR) and configured to receive a first power during a first time period to generate thermal energy, the first power increasing from a first startup power at a beginning of the first time period to a first steady state power at an end of the first time period; and
   a second zone of the multi-zone resistive heater formed from the material having the negative TCR, separated from the first zone by a gap, and configured to receive a second power during a second time period to generate the thermal energy, the second power increasing from a second startup power at a beginning of the second time period to a second steady state power at an end of the second time period, the beginning of the second time period being before the end of the first time period, and wherein a sum of the first steady state power and the first startup power is less than the total power and a sum of the first steady state power and the second steady state power is greater than the total power.

2. The system of claim 1, wherein the material having the negative TCR includes at least one of a carbon, a graphite, a carbon nanotube, a printed element having a conductive carbon loaded ink, or another allotrope.

3. The system of claim 1, wherein the multi-zone resistive heater is configured for use with an aircraft.

4. The system of claim 3, wherein the multi-zone resistive heater is configured for use with an airfoil of the aircraft.

5. The system of claim 1, wherein the gap operates as a dielectric boundary between the first zone and the second zone.

6. A system for controlling a multi-zone resistive heater, the system comprising:
   a first zone of the multi-zone resistive heater formed from a material having a negative temperature coefficient of resistivity (TCR) and configured to receive a first power to generate thermal energy;
   a second zone of the multi-zone resistive heater formed from the material having the negative TCR, separated from the first zone by a gap, and configured to receive a second power to generate the thermal energy; and
   a controller configured to:
      control power distribution of a total power to the first zone and to the second zone separately;
      transmit the first power to the first zone during a first time period, the first power increasing from a first startup power at a beginning of the first time period to a first steady state power at an end of the first time period; and
      begin transmitting the second power to the second zone before the end of the first time period, the second power increasing from a second startup power to a second steady state power, wherein the sum of the first steady state power and the second start up power is less than the total power and the sum of the first steady state power and the second steady state power is greater than the total power.

7. The system of claim 6, wherein the material having the negative TCR includes at least one of a carbon, a graphite, a carbon nanotube, a printed element having a conductive carbon loaded ink, or another allotrope.

8. The system of claim 6, wherein the multi-zone resistive heater is configured for use with an aircraft.

9. A method for controlling a multi-zone resistive heater, the method comprising:
transmitting, at a start of a first time period and until an end of the first time period, a first power to a first zone of the multi-zone resistive heater, the first zone being formed from a material having a negative temperature coefficient of resistivity (TCR), and the first power increasing from a first startup power at the start of the first time to a first steady state power at the end of the first time period; and
transmitting, at a start of a second time period and until an end of the second time period, a second power to a second zone of the multi-zone resistive heater, the second zone being formed from the material having the negative TCR, the start of the second time period being before the end of the first time period, the second power increasing from a second startup power at the start of the second time period to a second steady state power at the end of the second time period, wherein a sum of the first steady state power and the second startup power is less than a total power and a sum of the first steady state power and the second steady state power is greater than the total power.

10. The method of claim 9, wherein the material having the negative TCR includes at least one of a carbon, a graphite, a carbon nanotube, a printed element having a conductive carbon loaded ink, or another allotrope.

* * * * *